US006864993B1

(12) United States Patent
Roberts et al.

(10) Patent No.: US 6,864,993 B1
(45) Date of Patent: Mar. 8, 2005

(54) METHOD, SYSTEM, AND PROGRAM FOR DETERMINING CONSISTENCY OF INFORMATION ON A PRINT JOB

(75) Inventors: Arthur Ray Roberts, Boulder, CO (US); Mark Andrew Stephens, Westminister, CO (US); Adam Alvin Swartz, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,235

(22) Filed: Sep. 21, 1999

(51) Int. Cl.[7] ............................ G06F 15/00; H04N 1/00; H04N 1/46
(52) U.S. Cl. .................... 358/1.9; 358/406; 358/504
(58) Field of Search .................. 358/1.1, 1.6, 1.13, 358/1.15, 1.17, 406, 504, 1.9; 345/530, 545, 546; 707/500

(56) References Cited

U.S. PATENT DOCUMENTS

| | | | | |
|---|---|---|---|---|
| 5,594,840 A | * | 1/1997 | Sahay et al. ............... 358/1.14 |
| 6,088,120 A | * | 7/2000 | Shibusawa et al. ......... 358/1.15 |
| 6,275,600 B1 | * | 8/2001 | Banker et al. ............... 382/112 |
| 6,292,270 B1 | * | 9/2001 | Schwarz et al. ............. 358/1.9 |
| 6,335,978 B1 | * | 1/2002 | Moscato et al. ............ 382/112 |
| 6,377,711 B1 | * | 4/2002 | Morgana ..................... 382/274 |
| 6,437,876 B1 | * | 8/2002 | Phang et al. ................. 358/1.2 |
| 6,452,689 B1 | * | 9/2002 | Srinivasan .................. 358/1.15 |
| 6,498,661 B1 | * | 12/2002 | Brossman et al. .......... 358/3.14 |
| 6,512,845 B1 | * | 1/2003 | Haikin et al. ............... 382/165 |

* cited by examiner

*Primary Examiner*—Edward Coles
*Assistant Examiner*—Chan S. Park
(74) *Attorney, Agent, or Firm*—David W. Victor; Konrad Raynes & Victor LLP (57) ABSTRACT

Disclosed is a method, system, and program for checking an electronic representation of a print job. Information on a set of attributes of a print job indicated in a first computer readable file is compared with a set of same attributes of the print job indicated in a second computer readable file. A determination is made as to whether the information on the same set of attributes of the print job in the first and second computer readable files are inconsistent and each inconsistency is indicated.

45 Claims, 5 Drawing Sheets

FIG. 1

```
Printer's Collating List
Self-Extracting Zip File: I1002270.EXE
Direct Questions to: Roy Salinas
Title: Programm Dir for PSF Compatibility Fonts
Form Number: GI10-0227-00
Page Count: 48
Item   Type        Folio
 1     Title Page
 2     Text
 3     Text        iii
 4     Text        iv
 5     Text        v
 6     Text        vi
 7     Text        vii
 8     Text        viii
 9     Text        1
10     Text        2
11     Text        3
12     Text        4
13     Text        5
14     Text        6
15     Text        7
16     Text        8
17     Text        9
18     Text        10
19     Text        11
20     Text        12
21     Text        13
22     Text        14
23     Text        15
24     Text        16
25     Text        17
26     Text        18
27     Text        19
28     Text        20
29     Text        21
30     Text        22
31     Text        23
32     Text        24
33     Text        25
34     Text        26
35     Text        27
36     Text        28
37     Text        29
38     Text        30
39     Text        31
40     Text        32
41     Text        33
42     Text        34
43     Text        35
44     Text        36
45     Text        37
46     Text        38
47     Text        39
48     Blank
       Blank
       Back Cover Special Instructions
Files contained in I1002270.EXE
I1002270.B01 Document chunk
I1002270.B02 Document chunk
I1002270.BCV Back cover
I1002270.COL Collating List Fonts used in document
BookMasterGothic-Roman
Helvetica
BookMasterSymbol-Regular
IBM-Logo-8
Helvetica-Bold
Helvetica-Oblique
BookMasterGothic-Bold Cover and spine files
Front Cover: NONE
Back Cover : I1002270.BCV -- Pages: 1 Size: 14010
Spine : NONE Pages in individual files I1002270.B01 -- Pages: 32 Size: 294457
i ii iii iv v vi vii viii 1 2 3 4 5 6 7 8 9 10 11
12 13 14 15 16 17
18 19 20 21 22 23 24

I1002270.B02 -- Pages: 15 Size: 75625
25 26 27 28 29 30 31
32 33 34 35 36 37 38 39
```

METHOD, SYSTEM, AND PROGRAM FOR DETERMINING CONSISTENCY OF INFORMATION ON A PRINT JOB

BACKGROUND OF THE INVENTION

1. Field of the Invention

The present invention relates to a method, system, and program for checking the consistency of information on a print job maintained in different files and, in particular, determining such information for error checking and print shop selection purposes.

2. Description of the Related Art

Print files which contain the entire content of large documents, such as manuals and books, are often created using the PostScript page description language.** The PostScript language is used by document publishers and creators to specify in the print file the complex fonts, graphics, and image handling capabilities of the print job. The PostScript language must be interpreted by a transform process in the printer or elsewhere in the network to produce a printer image file that is ready to be printed. Print image files are in a bit-mapped image format, also known as a raster image or rasterized version of the print file. A raster image processor (RIP) translates print files in a page description language to a raster image or RIP version of the file. In the publishing environment, it can take several hours to transform a large print file to its RIP version.

**PostScript is a registered trademark of Adobe Systems, Inc.; AIX and RS/6000 are registered trademarks and PRINT SERVICES FACILITY is a trademark of IBM.

In a large scale publishing environment, documents must be proofed for correctness before reproducing in mass quantities. The proof stage is often very labor intensive. For large documents, one or more persons will have to carefully proof the entire document, page-by-page, including checking the margins, checking the fonts used throughout the document, the quality of color images, accuracy of identification information, etc. Not only is this process labor intensive, but a substantial amount of printer resources including printers and paper must be dedicated to printing the proof copies.

There is thus a need in the art to provide an improved system and method for determining whether the output of a print job conforms with information on the print job from different sources.

SUMMARY OF THE PREFERRED EMBODIMENTS

To overcome the limitations in the prior art described above, preferred embodiments disclose a system, method, and program for checking an electronic representation of a print job. Information on a set of attributes of a print job indicated in a first computer readable file is compared with a set of same attributes of the print job indicated in a second computer readable file. A determination is made as to whether the information on the same set of attributes of the print job in the first and second computer readable files are inconsistent and each inconsistency is indicated.

In further embodiments, the first computer readable file includes attributes of the print job that require minimum margins and the second computer readable file comprises a bitmap created by rasterizing the print job. In such case, determining whether the information on the same set of attributes in the first and second computer readable files are consistent comprises determining required margins to print according to the attributes in the first computer readable file. The bitmap file is scanned to determine whether any pixels are set "on" within the required margins. The information is inconsistent if one pixel is set "on" in the bitmap file within the required margins.

In still further embodiments, the first computer readable file is a print file including computer recognizable statements in a page description language indicating attributes of the print job that are compared with the same attributes in the second computer readable file.

In yet further embodiments, an electronic message is received from a transform process that rasterized the print file. A determination is then made as to whether print job attributes indicated in the print file are consistent with information in the received message.

In additional embodiment, print attribute information in the print file is used to search a computer database including records indicating print shops to determine at least one print shop capable of reproducing the print job. A list of print shops capable of reproducing the print job is displayed and user selection of a print shop is received.

Preferred embodiments provide a method, system, and program for determining whether inconsistencies exist for a print job as indicated in files or data streams that provide information on the print job. Further, information from transforming the print job and the transformed print job, which is typically in the form of a bit map image, may also be compared with print attribute information to determine any inconsistencies in expected and actual output. Any determined inconsistencies are written to a report that a user may review to determine what corrective actions, if any, are needed to eliminate any discrepancies. Thus, preferred embodiments provide an automated method for notifying a publisher of discrepancies in the input and output to allow the publisher to readily determine the corrective action needed to remove the inconsistency pinpointed in the report. This allows the publisher to validate a print file before rasterizing and forwarding to a print shop to reproduce. By validating the print file, the publisher is ensured that the print shop will not have to delay and charge fees to correct any discrepancies in the input and output of the print job.

Preferred embodiments are also used to assist the publisher in selecting a print shop to reproduce the print job based on determined print attributes of the print job and the capabilities of different print shops indicated in records in a database table. Determined attributes of the print job are use to query the table of print shop records to locate print shops that can handle the print job. The system may also display cost and performance data for each print shop capable of handling the job to allow the user to easily and readily select one print shop to reproduce the job. The system may further take automated steps to deliver the rasterized print job to the print shop, such as generating and transmitting an electronic mail message to the print shop with the rasterized print file included.

Preferred embodiments thus provide convenient and automated methods and systems to determine discrepancies in a print job and select and deliver a print job to a print shop. These automated methods are significantly faster and less costly than the labor intensive processes that are used today to check for consistencies and select a print shop to reproduce a print job.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Printing Environment

Figure 1:
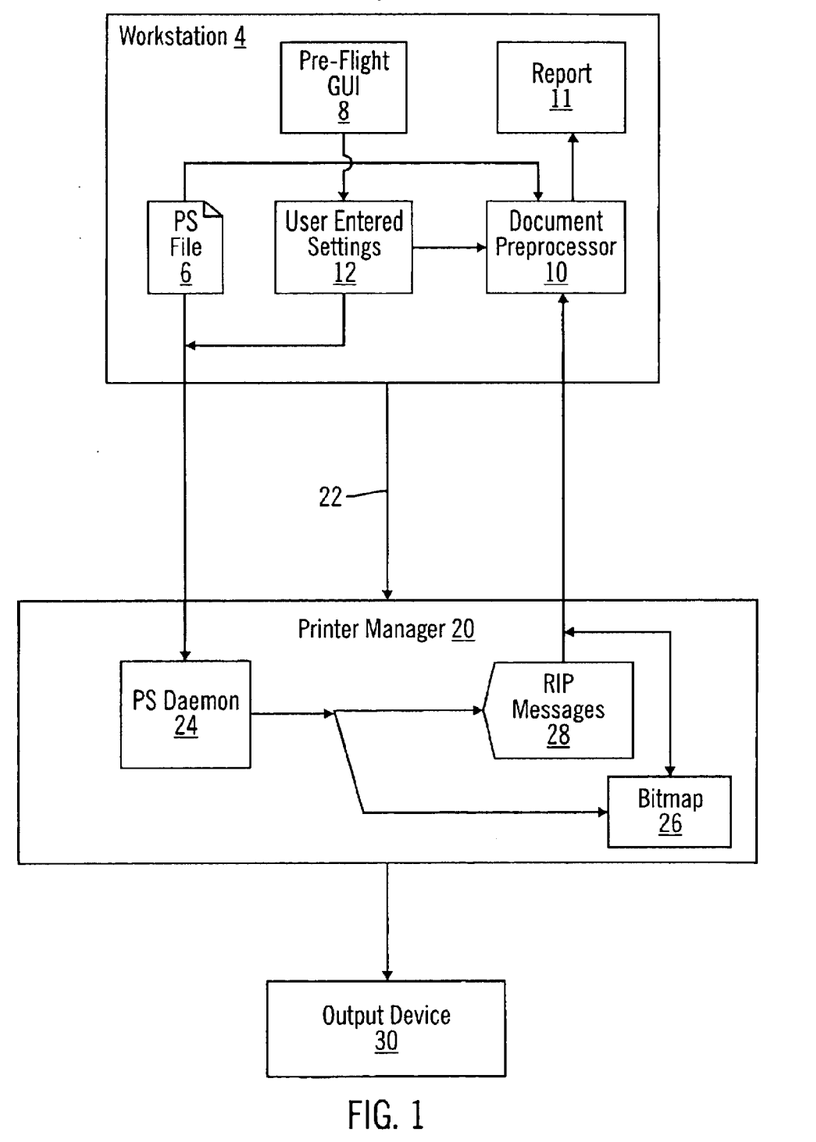
FIG. 1 is a block diagram illustrating a printer environment in which preferred embodiments of the present invention are implemented.

FIG. 1 illustrates a printing environment in which preferred embodiments are implemented. A workstation 4 includes a PostScript file (PS) 6, which is a print file including PostScript commands, a pre-flight graphical user interface (GUI) 8, and a document pre-processor 10. Through the pre-flight GUI 8, a user may specify certain attributes of the print job, referred to herein as user entered settings 12. The user entered settings 12 may include print resolution, egg., 240, 300 or 600 dpi, whether there are drills, bleeds and a trace. Drills refers to holes and bleeds are tab boxes on the edges of the document. Trace is a program that runs during processing to record system events such as supervisor calls and start I/O operations for problem determination. The user may also specify in the pre-flight GUI 8 paper size, e.g., letter, legal, A1–A5, and ledger, customer page sizes, e.g., width, height, X-offset, and Y-offset.

The workstation 4 is in communication with a printer manager 20 via a network 22. The network 22 may be comprised of any network system known in the art including TCP/IP network (e.g., an Intranet, the Internet), LAN, Ethernet, WAN, System Area Network (SAN), Token Ring, etc. Alternatively, there may be separate and different networks between the components.

The printer manager 20 includes a PostScript (PS) daemon 24 that transforms a PostScript file into a rasterized, printer readable format. Daemon processes generally provide services that must be available at all times. A daemon runs continuously, looking for work to do, performing that work, and waiting for more work. The transform of a PostScript file to a bitmap file is also referred to as a raster image process (RIP). The term RIP is used herein interchangeably with transform process and printer daemon to refer to any type of transform process regardless of the format of the file being transformed to a printer readable format, i.e., bitmap file. The terms RIP, RIPper, RIPped, and RIPping all refer to a particular stage or instance of a RIP transform process.

In preferred embodiments, the PostScript daemon 24 would receive the PostScript file 6 and user entered settings 12 from the workstation 4 and transform the file 6 according to the user settings 12 and commands in the PostScript file 6 into an uncompressed bitmap file 26 in a manner known in the art. The bitmap 26 would include bitmap renderings of each page in the document. The PostScript daemon 24 would also generate various RIP messages 28 concerning the results of the transformation, including the fonts used, number of pages, etc., in a manner known in the art. The printer manager 20 would then transfer the bitmap 26 and RIP messages 28 to the document preprocessor 10 in the workstation 4 to perform an analysis of the output results of the transformation in accordance with the preferred embodiments of the present invention.

The workstation 4 may comprise any computer system known in the art and include software to submit print jobs to the printer manager 20. The printer manager 20 would include software suited for processing and transforming multiple large print jobs, such as the IBM InfoPrint manager software that runs on the IBM RS/6000 server under the AIX operating system.** The PostScript daemon 24 may comprise any PostScript interpreter known in the art which transforms PostScript and other file formats into an printer readable data stream, such as the PS2AFP transform included in the IBM Aix Print Services Facility/6000 (PSF/6000) and InfoPrint Manager for AIX.

The content included in the PS file 6 is transformed (RIPped) by the printer manager 20 and then sent to an output device 30. The output device 30 may comprise a printer, display or other raster device for rendering output from a RIPped file.

Pre-Processing a Print File

With reference to FIG. 1, the PostScript file 6 and user entered settings 12 are transferred to the PostScript (PS) daemon 24, which then transforms the document to an uncompressed bitmap image 26 and generates information on the results of the transformation into RIP messages 28. The document pre-processor 10 receives the PostScript file 6, the user entered settings 12, the RIP messages 28, and the bitmap 26. The document pre-processor 10 will then analyze all this information to determine if all these components which describe the print job are consistent with each other. Inconsistencies may indicate that the PostScript file 6 is not being transformed as intended.

Figure 2:
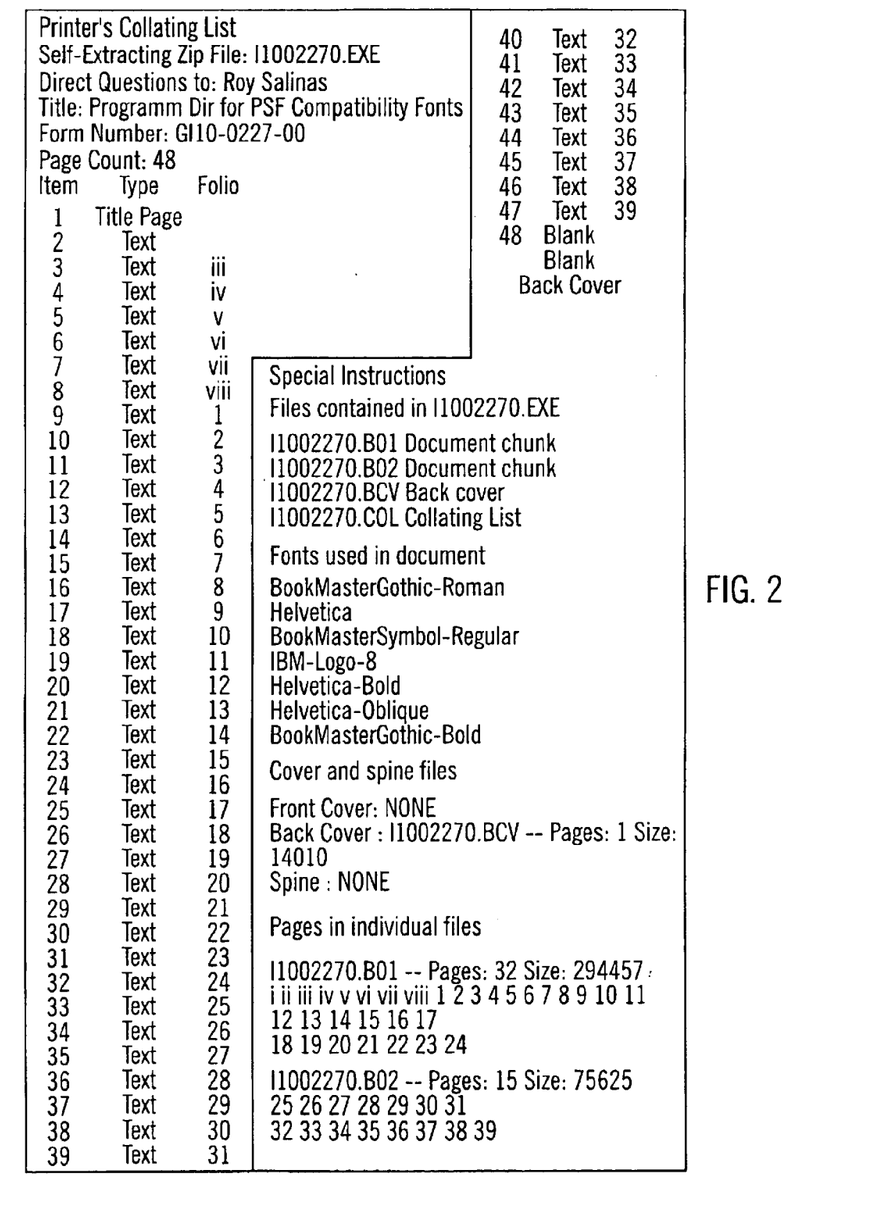
FIG. 2 illustrates an example of a collation file used with the preferred embodiments of the present invention.

The PostScript file 6 may comprise multiple sub-files in a compressed format. Each PostScript sub-file may comprise a different section of the document. A file with a ".bcv" extension may comprise the back cover, a ".fcv" extension may comprise a front cover, and extensions of ".bo1" and "bo2" may indicate different sections of the document. Moreover, if the document includes images, then some of the sub-files may comprise image files, such as TIFF, JPEG, BMP, etc. images. The PostScript file 6 may also include a collation file that includes information describing attributes of the print job in the PostScript file 6 that entered by a person who was involved in creating the PostScript file. FIG. 2 illustrates an example of the content of a collation file, including information on the pages, files in the compressed ZIP PostScript file, the different sub-files and pages included in each sub-file, and fonts used.

Each sub-file within the PostScript file 6 includes a prolog section that provides procedure definitions and print attributes to control the PS daemon 24 when RIPping the PostScript file 6. In preferred embodiments, the PostScript file 6 includes comments conforming to the PostScript language. The publication entitled "PostScript Language Document Structuring Conventions Specification, Version 3.0," having document no. LPS5001 (Copyright Adobe Systems, Inc. 1992), provides details of the PostScript language comments that define the attributes of a print job. The PostScript language is further discussed in the publication entitled "PostScript Language Reference Manual" (Copyright Adobe Systems, Inc., 1999, 3d edition). Both of the above publications from Adobe Systems, Inc. describing the PostScript language and comments are incorporated herein by reference in their entirety The bitmap 26 comprises an uncompressed bit map for each page in the document. The bitmap 26 includes a bit for each pixel in the image. If a pixel value is "on," then there is content in that pixel.

Figure 3:
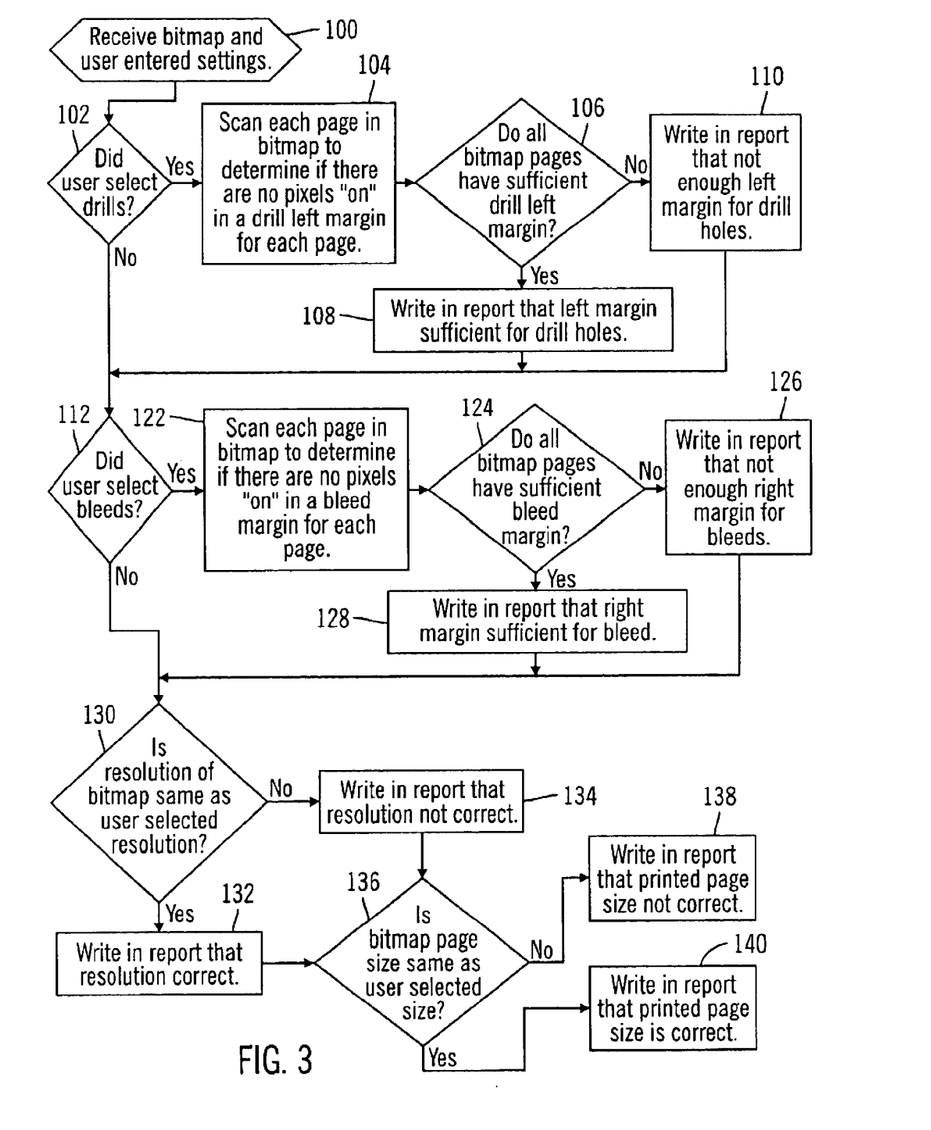
FIG. 3 illustrates logic for determining whether the transformed print file conforms to user entered settings in accordance with preferred embodiments of the present invention.

FIG. 3 illustrates logic implemented in the document pre-processor 10 to determine the consistency of the user generated settings 12 and the transformed bitmap 26. Control begins at block 100 with the document pre-processor 10 receiving the bitmap 26, including bitmap images for each page in the document, and the user generated settings 12. The document pre-processor 10 determines (at block 102) from the user entered settings 12 whether the user selected drill holes in the document. If so, then the document pre-processor 10 scans (at block 104) each page of the RIPped document, as expressed in the bitmap 26, to determine (at block 106) whether each page has a sufficient left margin to support drill holes, referred to as a drill left margin. If so, then the document pre-processor 10 writes (at block 108) in report 11 (in FIG. 1) that the left margin is sufficient to support drill holes; otherwise, it writes (at block 110) that it is not sufficient. After considering the drill holes, the document pre-processor 10 determines (at block 112) whether the user selected to print with bleeds. A bleed is a graphic tab printed on the right hand side of the page indicating the section of the document. Thus, to print bleeds, there must be a minimum area to the right and left of the bleed that does not include text, referred to as the bleed margin. If there are no pixels "on" in the area of the bleed margin on each page of the bitmap 26 (at blocks 122 and 124), then the document pre-processor 10 writes (at block 128) to the report that the right margin is sufficiently wide to support bleeds; otherwise, it writes (at block 126) that the right margin does not support bleeds.

The document pre-processor 10 would also check (at block 130) whether the resolution of the bitmap 26, i.e., the dots or pixels per inch in the bitmap 26, against the user specified resolution and write the appropriate result of this check (at blocks 132 or 134) to the report. Similarly, the document pre-processor 10 would check (at block 136) the size of the bitmap 26 to determine if it is the same size as the user selected paper size indicated in the user entered settings 12 and write the results (at block 138 or 140) to the report.

Next, the document pre-processor 10 would check the print attribute information specified in the prolog and script sections of the PostScript file 6. The script sections of the PostScript file include information on each page in the document to print. To perform this operation, the document pre-processor 10 would have to parse the header section of the prolog in the PostScript file 6 in a manner known in the art to locate PostScript comments indicating the attributes of the document. The document pre-processor 10 would, thus, search the header section of the prolog in the PostScript file 6 for specified comments from a list maintained by the document pre-processor 10 and then take appropriate checking action if a certain comment is found in the prolog section. The information checked in the header section of the prolog could include the pages comment indicating the number of pages in the entire document, the bounding box comment indicating the dimensions of a box that enclose all markings on all pages of the document, and the orientation comment indicating a landscape or portrait orientation. Further, each page would have comment information indicating boundaries and orientation for the specific page. The document pre-processor 10 may check the following PostScript comments:

DocumentMedia indicating the size, type, color, and weight of the print paper.

%% DocumentFonts indicating the fonts used to print the document.

%% DocumentNeededFiles indicating documents added to the print job with an include command. There are also document needed fonts that must be added and fonts supplied in the document.

%% DocumentSuppliedFiles indicating files supplied with the PostScript file 6.

%% Requirements: describes document requirements and can be used to determine whether printer selected is capable of printing the print job. The requirements include: indication of whether to collate, color printer needed, duplex, fax, fold, resolution, etc.

The above are examples of the type of comments the document pre-processor 10 could consider. However, the document pre-processor 10 could check the consistency with respect to any comment type included in the PostScript file. Further details on comment types that could be checked in accordance with the preferred embodiments are described in the publication "PostScript Language Document Structuring Conventions Specification, Version 3.0," which was incorporated by reference above.

Below is a list providing an example of consistency checking operations for the document pre-processor 10 and actions to take upon determining inconsistency. Information on the results of these consistency checks are written to the report.

1. Determine if fonts indicated in PostScript file match those used during transform as indicated in RIP message 28. Indicate any discrepancies.

2. Determine whether the color convention specified in the color header comments of the prolog indicates RGB. If so, flag an error. Otherwise, write to the report the type of color, e.g., CMYK or CMY.

3. Compare page (%% PageBoundingBox) and document (%% BoundingBox) boundaries specified in PostScript file 6 with transformed page in bitmap 26 to determine if any pixels are "on" outside of the boundaries. If so, flag an error for the document or the page.

4. Compare included files specified in prolog (%% DocumentSupplied Files) with files in compressed PostScript file to determine whether each sub-file in the actual PostScript file 6 package corresponds to one of the supplied files specified in the prolog. Flag any discrepancies in the report.

The above comparisons and determinations among the user entered settings 112, the comments in the prolog of the PostScript file 6, information in the RIP messages 28, the bitmap 26, and the actual content of the PostScript file 6 package are performed to determine whether the PostScript file 6 includes all necessary components of the print job, such as specified sub-files, images, fonts, etc., and determine whether the settings specified in the PostScript file 6 are consistent. A publisher could use the report including information on discrepancies and other information on the parameters of the print job to readily determine the reason for the discrepancy and take appropriate action, by adding fonts, adding missing subfiles, etc. In this way, the PostScript file 6 and user entered settings 12 are continually tailored and corrected in such a manner so that the output transformed file, as indicated in the bitmap 26 and RIP messages 28, are completely consistent with the PS file 6 and any user entered settings 12. After the PostScript file 6 produces output that is consistent, then the PostScript file 6 is sent to a print shop to render and reproduce in mass quantity. As a result of correcting any consistencies flagged in the report, the resulting RIPped file will be ensured to include all the fonts and other information needed to allow the print shop to accurately reproduce the file as intended. In this way, the publisher or creator of the RIPped file will not have to incur costs from the print shop to take corrective action, e.g., add fonts, detect missing sub-files, etc.

The report, produced using the document pre-processor of the preferred embodiments, thus can be used to guide a user to correct a PostScript file 6 in a manner that is far more efficient than having a person manually review the document to determine inconsistencies, e.g., missing fonts, incorrect margins, etc.

The document pre-processor 10 may also be used to determine whether the information in the collation file, as shown in FIG. 2, is correct in view of the information specified in the comments in the prolog section of the PostScript file 6 and the output from the PostScript daemon 24. As discussed, the collation file is generated by the person who created the PostScript file 6. By detecting discrepancies in the collation file and the actual output, corrective action may be taken with respect to the PostScript file 6 or the collation file to conform to what was originally intended and to provide consistency. Below are examples of some of the checking actions the document pre-processor 10 may perform with respect to the collation file and responses:

1. Compare pages indicated in collation file with pages printed as indicated in RIP messages 28. Indicate a discrepancy in the report.

2. Compare the sub-files the collation file indicates are included with the included files indicated in the PostScript prolog comments. Indicate any discrepancies in the report.

3. Compare the fonts indicated in the collation file with the fonts used as indicated in the RIP messages 28. Indicate any discrepancies in the report.

4. Determine whether the PostScript file 6 includes any front and back covers indicated in the collation file. Indicate any discrepancies in the report.

Figure 4:
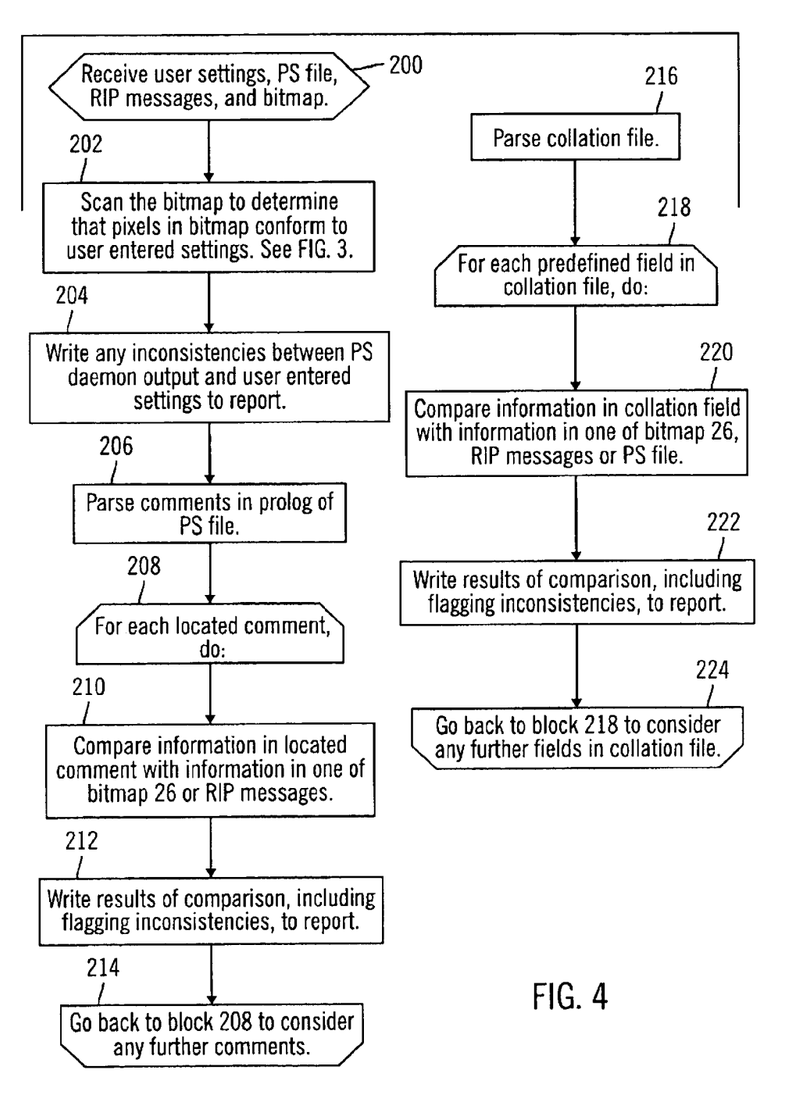
FIG. 4 illustrates logic for determining whether there are any inconsistencies among the PostScript file, transform process output, and user settings in accordance with preferred embodiments of the present invention.

FIG. 4 illustrates logic implemented in the document pre-processor 10 to integrating the checking operations described above. Control begins at block 200 with the document pre-processor 10 receiving the user entered settings 12, the PostScript (PS) file 6, the RIP messages 28, and the bitmap 26. The document pre-processor 10 scans (at block 202) the bitmap 26 to determine that the pixels in the bitmap conform to user entered settings 12 as discussed with respect to FIG. 3. Any inconsistencies are written (at block 204) to the report. The document pre-processor 10 then parses (at block 206) the comments in the prolog and, perhaps, script sections of the PostScript file 26, to locate predefined comments. For each comment located (at block 208), the document pre-processor 10 compares (at block 210) information in the located comment with corresponding information in the bitmap 26 or the RIP messages 28. Any discrepancies and inconsistencies among the different sources of information are written (at block 212) to the report. Control proceeds (at block 214) back to block 208 to consider any additional located comments.

After checking all the comments in the PostScript file 6 to consider, the document pre-processor 10 parses (at block 216) the collation file. For each predefined field in the collation file (at block 218), the document pre-processor 10 compares (at block 220) the information in the collation field with information in the bitmap 26, RIP messages 28 or PostScript file 6. Examples of comparisons that can be made were described above. Any inconsistencies or discrepancies are written (at block 222) to the report.

The publisher examining the report and noting discrepancies among the collation file, PostScript file 6, and RIP messages 6 could then take corrective action by modifying the collation file or the PostScript file 6 to ensure conformance. By applying corrections as needed, the publisher will ensure that all the component parts of the print job are in conformance, including the description of the print job in the collation file. Further, in preferred embodiments, the report indicating discrepancies may be automatically e-mailed to a specified person and include in the header of the e-mail message an indication of whether the print job failed or succeeded.

After correcting any inconsistencies, the report further indicates key attributes, such as the type of color attributes, paper media, paper size, etc. As discussed, these attributes are specified in comments within the PostScript file 6, such as the "%% Requirements" comment. Using this report, the publisher may then examine a list of print shops and determine the print shops capable of reproducing the print job. In this way, the report can be used to select the print shop best suited to handle the print job based on cost and capabilities of the print shop.

Figure 5:
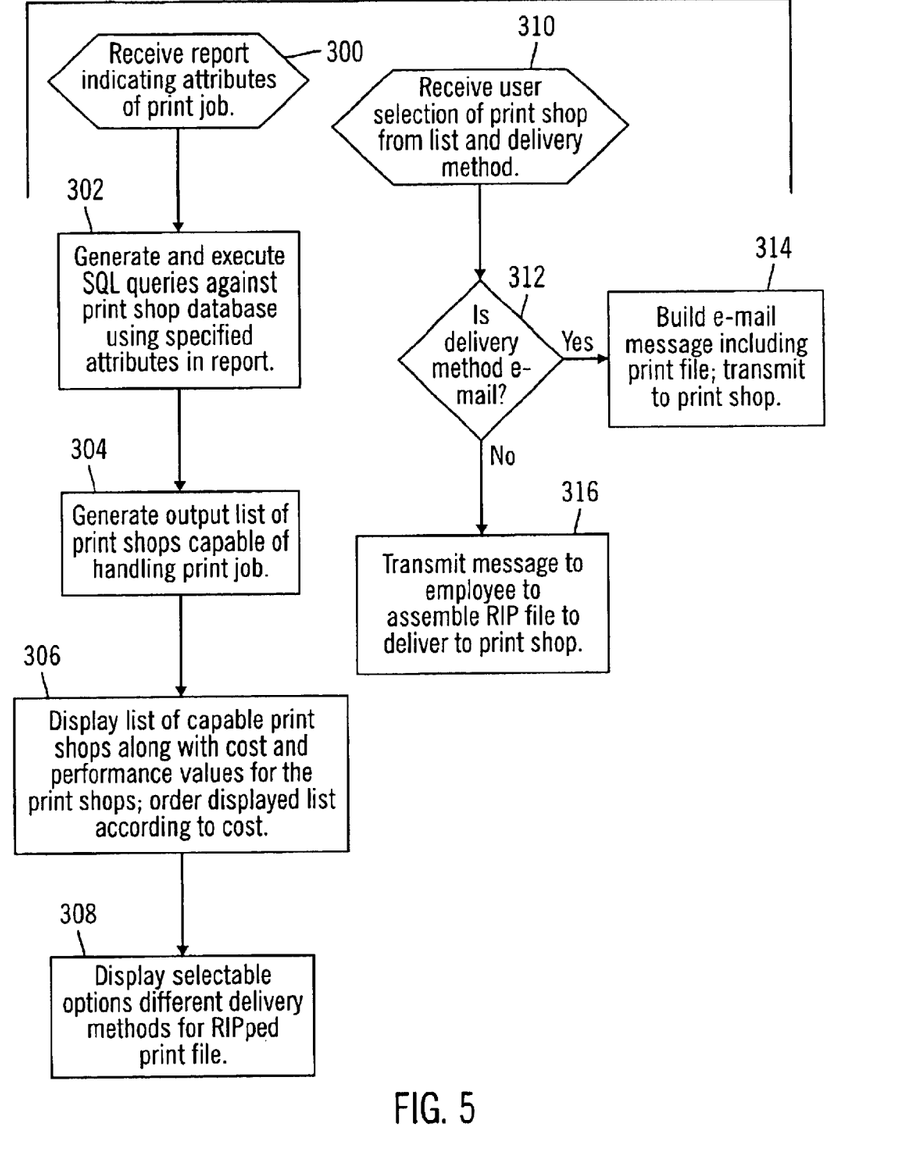
FIG. 5 illustrates logic for selecting a print shop to reproduce the print job in accordance with preferred embodiments of the present invention.

In further embodiments, the publisher may maintain a database including a record for each print shop that offers printing services to the publisher. Each print shop record may include fields indicating the capabilities of the print shop, which correspond to attributes of the print job written to the report. Other fields may also indicate costs the printer charges and performance information, such as turnaround load capacity, location, etc. FIG. 5 illustrates logic implemented in the document pre-processor 10 for utilizing such a print shop database in accordance with the preferred embodiments. At block 300, the document pre-processor 10 receives the report indicating attributes of the print job, which are likely gleaned from the comments in the PostScript file 6. The document pre-processor 10 generates and executes (at block 302) Structured Query Language (SQL) searches of the print shop database table using as search parameters the attributes of the print job written to the report. Such a query would locate print shops capable of processing the print job. For instance, if the print job required printing pages using CMYK coloring, then the document pre-processor 10 could search a color capability field in the database table on CMYK to locate all print shops capable of processing CMYK print jobs. From these SQL queries, the document pre-processor 10 would generate (at block 304) an output list of print shops capable of reproducing the document.

The document pre-processor 10 would then display (at block 306) through a graphical user interface (GUI) the output list of print shops along with cost and performance data maintained for each listed print shop. In preferred embodiments, the print shops in the output list may be ordered when displayed according to one or more of the cost and performance parameters. Next to each displayed print shop could be a GUI selection element, such as a radio button, to allow an operator to select one of the print shops to reproduce the print job. The GUI would further display (at block 308) selectable delivery options for the print job. Upon receiving the user selection of a print shop and one or more delivery methods (at block 310), the document pre-processor 10 would then determine (at block 312) the selected delivery options. If e-mail was selected, then the document pre-processor would build (at block 314) an e-mail message including the PostScript file 6 as an attachment and transmit the e-mail message to the selected print shop. If another delivery option was selected such as by mail, then an e-mail message would be sent (at block 316) to an employee of the publisher to prepare a package to send to the selected print shop. Further steps could be taken, such as printing a label for the print shop. The employee would then copy the PostScript file 6 to a disk storage medium for delivery to the print shop. It is possible that multiple delivery options could be selected.

Preferred embodiments provide a method, system, and program for selecting print shops to reproduce a print job based on determined attributes of the print job and capabilities of different print shops as indicated in database records. In this way, the publisher does not have to determine the attributes and then separately determine print shops that could handle the print job. Instead, the publisher is presented with a list of print shops that are capable of printing the job and performance information based on cost and other service parameters, e.g., turnaround, location, etc. This allows the publisher to conveniently review available print shops and select a print shop from the list. After selecting a print shop, the document pre-processor 10 automatically takes steps to cause the delivery of the print file along with instructions on the print job, e.g., number of pages, paper quality, due date, etc. These further parameters of the print job may be entered into the GUI which displayed the output list of print shops.

CONCLUSION/ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to the PostScript page description language. However, in alternative embodiments the preferred embodiment analysis scheme could apply to print files including commands in any page description language known in the art, and is not limited to the PostScript page description language. If other page description languages are used, then a daemon capable of transforming or RIPping files including instructions in such alternative page description languages is used in place of the PostScript daemon 24 described in the preferred embodiments.

Preferred embodiments described the document pre-processor as checking specific types of information. However, any attribute or print related factors may be considered during the consistency checking process. Further, other files and sources of information may be utilized in performing the consistency checking, in addition to those sources of information described herein, such as the PostScript file 6, user entered settings 12, and PostScript daemon output 24, discussed herein.

The workstation 4 and printer manager 20 may be implemented in different computing environments, such as a network printing environment where on or more networks provide communication between the devices. Alternatively, in a desktop environment, the workstation 4 and printer manager 20 may be implemented in a single desktop machine, such as a personal computer or workstation, that is connected to a printer or other output device. Numerous other configurations are also possible.

In preferred embodiments, any inconsistencies in print attribute information were written to a report. In alternative embodiments, the publisher may be alerted to inconsistencies in other manners, such as a screen display or e-mail message.

In summary, preferred embodiments disclose a system, method, and program for checking an electronic representation of a print job. Information on a set of attributes of a print job indicated in a first computer readable file is compared with a set of same attributes of the print job indicated in a second computer readable file. A determination is made as to whether the information on the same set of attributes of the print job in the first and second computer readable files are inconsistent and each inconsistency is indicated.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method for checking an electronic representation of a print job, comprising:

comparing information on a set of attributes of a print job indicated in a first computer readable file with transformed output of the print job in a second computer readable file, wherein each attribute in the set of attributes specifies an attribute value;

determining attributes of the transformed output corresponding to the set of attributes;

determining whether the determined attributes of the transformed output are consistent with the attribute values for the set of attributes information on the same set of attributes of the print job in the first and second computer readable files are inconsistent; and indicating each determined inconsistency.

2. The method of claim 1, wherein indicating the inconsistency comprises writing information on the inconsistency to a third computer readable file.

3. The method of claim 1, wherein the inconsistency information is transmitted in an electronic message to an electronic mail address.

4. The method of claim 1, wherein the first computer readable file is a print file including computer recognizable statements in a page description language indicating attributes of the print job that are compared with the same attributes in the second computer readable file.

5. The method of claim 4, wherein the second computer readable file comprises a bitmap created by rasterizing the print file, wherein determining whether the information on the same set of attributes in the first and second computer readable files are consistent comprises:
   determining required margins to print according to boundary attributes indicated in the print file; and
   scanning the bitmap file to determine whether any pixels are set "on" outside of boundary limits specified in the boundary attributes indicated in the print file, wherein the information is inconsistent if one pixel is set "on" outside of the boundary limits.

6. The method of claim 4, further comprising:
   receiving an electronic message produced from a transform process that rasterized the print file; and
   determining whether print job attributes indicated in the print file are consistent with information in the received message.

7. The method of claim 6, wherein the received electronic message indicates fonts used in rasterizing the print file, wherein determining whether print job attributes indicated in the print file are consistent with information in the received message comprises determining whether fonts indicated in the print file as included in the print job are the same as fonts indicated in the received message, wherein there is an inconsistency if the fonts indicated in the print file are different than the fonts indicated in the received message.

8. The method of claim 4, further comprising:
   determining whether a color convention specified in the print file is not a printer color space; and
   indicating an error if the color convention is not a printer color space.

9. The method of claim 1, further comprising:
   using print attribute information in the print file to search a computer database including records indicating print shops to determine at least one print shop capable of reproducing the print job;
   displaying a list of print shops capable of reproducing the print job; and
   receiving user selection of a print shop.

10. The method of claim 9, further comprising displaying cost information for each print shop in the list.

11. The method of claim 9, further comprising:
    receiving user selection of a delivery method; and
    taking action to transmit the print file to the selected print shop.

12. The method of claim 11, wherein taking action comprises generating and transmitting an electronic message including the print file to the selected print shop.

13. The method of claim 1, wherein the set of attributes includes at least one of the following print attributes: drill holes selected, bleeds selected, resolution, paper size, paper type, paper weight, fonts, collate, color printer, duplex, fax, and fold.

14. A computerized method for checking an electronic representation of a print job, comprising:
    comparing information on a set of attributes of a print job indicated in a first computer readable file with transformed output of the print job in a second computer readable file, wherein each attribute in the set of attributes specifies an attribute value, wherein the first computer readable file includes attributes of the print job that require minimum margins and wherein the second computer readable file comprises a bitmap created by rasterizing the print job
    determining attributes of the transformed output corresponding to the set of attributes;
    determining required margins to print according to the attributes in the first computer readable file; and
    scanning the bitmap file to determine whether any pixels are set "on" within the required margins, wherein the information is inconsistent if one pixel is set "on" in the bitmap file within the required margins; and
    indicating each determined inconsistency.

15. The method of claim 14, wherein the required margins are sufficient to allow one of holes to be drilled in a left margin and bleeds to be printed in a right margin.

16. A system for checking an electronic representation of a print job, comprising:
    means for comparing information on a set of attributes of a print job indicated in a first computer readable file with transformed output of the print job in a second computer readable file, wherein each attribute in the set of attributes specifies an attribute value;
    means for determining attributes of the transformed output corresponding to the set of attributes;
    means for determining whether the determined attributes of the transformed output are consistent with the attribute values for the set of attributes; and
    means for indicating each determined inconsistency.

17. The system of claim 15, wherein indicating the inconsistency comprises writing information on the inconsistency to a third computer readable file.

18. The system of claim 16, wherein the inconsistency information is transmitted in an electronic message to an electronic mail address.

19. The system of claim 16, wherein the first computer readable file is a print file including computer recognizable statements in a page description language indicating attributes of the print job that are compared with the same attributes in the second computer readable file.

20. The system of claim 19, wherein the second computer readable file comprises a bitmap created by rasterizing the print file, wherein determining whether the information on the same set of attributes in the first and second computer readable files are consistent comprises:
    determining required margins to print according to boundary attributes indicated in the print file; and
    scanning the bitmap file to determine whether any pixels are set "on" outside of boundary limits specified in the boundary attributes indicated in the print file, wherein the information is inconsistent if one pixel is set "on" outside of the boundary limits.

21. The system of claim 19, further comprising:
    receiving an electronic message produced from a transform process that rasterized the print file; and
    determining whether print job attributes indicated in the print file are consistent with information in the received message.

22. The system of claim 21, wherein the received electronic message indicates fonts used in rasterizing the print file, wherein determining whether print job attributes indicated in the print file are consistent with information in the received message comprises determining whether fonts indicated in the print file as included in the print job are the same as fonts indicated in the received message, wherein there is an inconsistency if the fonts indicated in the print file are different than the fonts indicated in the received message.

23. The system of claim 19, further comprising:
  determining whether a color convention specified in the print file is not a printer color space; and
  indicating an error if the color convention is not a printer color space.

24. The system of claim 16, further comprising:
  using print attribute information in the print file to search a computer database including records indicating print shops to determine at least one print shop capable of reproducing the print job;
  displaying a list of print shops capable of reproducing the print job; and
  receiving user selection of a print shop.

25. The system of claim 24, further comprising displaying cost information for each print shop in the list.

26. The system of claim 24, further comprising:
  receiving user selection of a delivery method; and
  taking action to transmit the print file to the selected print shop.

27. The system of claim 26, wherein taking action comprises generating and transmitting an electronic message including the print file to the selected print shop.

28. The system of claim 16, wherein the set of attributes includes at least one of the following print attributes: drill holes selected, bleeds selected, resolution, paper size, paper type, paper weight, fonts, collate, color printer, duplex, fax, and fold.

29. A system for checking an electronic representation of a print job, comprising:
  means for comparing information on a set of attributes of a print job indicated in a first computer readable file with transformed output of the print job in a second computer readable file, wherein each attribute in the set of attributes specifies an attribute value, wherein the first computer readable file includes attributes of the print job that require minimum margins and wherein the second computer readable file comprises a bitmap created by rasterizing the print job
  means for determining attributes of the transformed output corresponding to the set of attributes;
  determining required margins to print according to the attributes in the first computer readable file;
  scanning the bitmap file to determine whether any pixels are set "on" within the required margins, wherein the information is inconsistent if one pixel is set "on" in the bitmap file within the required margins; and
  means for indicating each determined inconsistency.

30. The system of claim 29, wherein the required margins are sufficient to allow one of holes to be drilled in a left margin and bleeds to be printed in a right margin.

31. An article of manufacture for checking an electronic representation of a print job, the article of manufacture comprising computer usable media including at least one computer program and at least one work process embedded therein that causes at least one computer to perform:
  comparing information on a set of attributes of a print job indicated in a first computer readable file with transformed output of the print job in a second computer readable file, wherein each attribute in the set of attributes specifies an attribute value;
  determining attributes of the transformed output corresponding to the set of attributes;
  determining whether the determined attributes of the transformed output are consistent with the attribute values for the set of attributes; and
  indicating each determined inconsistency.

32. The article of manufacture of claim 31, wherein indicating the inconsistency comprises writing information on the inconsistency to a third computer readable file.

33. The article of manufacture of claim 31, wherein the inconsistency information is transmitted in an electronic message to an electronic mail address.

34. The article of manufacture of claim 31, wherein the first computer readable file is a print file including computer recognizable statements in a page description language indicating attributes of the print job that are compared with the same attributes in the second computer readable file.

35. The article of manufacture of claim 34, wherein the second computer readable file comprises a bitmap created by rasterizing the print file, wherein determining whether the information on the same set of attributes in the first and second computer readable files are consistent comprises:
  determining required margins to print according to boundary attributes indicated in the print file; and
  scanning the bitmap file to determine whether any pixels are set "on" outside of boundary limits specified in the boundary attributes indicated in the print file, wherein the information is inconsistent if one pixel is set "on" outside of the boundary limits.

36. The article of manufacture of claim 34, further comprising:
  receiving an electronic message produced from a transform process that rasterized the print file; and
  determining whether print job attributes indicated in the print file are consistent with information in the received message.

37. The article of manufacture of claim 36, wherein the received electronic message indicates fonts used in rasterizing the print file, wherein determining whether print job attributes indicated in the print file are consistent with information in the received message comprises determining whether fonts indicated in the print file as included in the print job are the same as fonts indicated in the received message, wherein there is an inconsistency if the fonts indicated in the print file are different than the fonts indicated in the received message.

38. The article of manufacture of claim 34, further comprising:
  determining whether a color convention specified in the print file is not a printer color space; and
  indicating an error if the color convention is not a printer color space.

39. The article of manufacture of claim 31, further comprising:
  using print attribute information in the print file to search a computer database including records indicating print shops to determine at least one print shop capable of reproducing the print job;
  displaying a list of print shops capable of reproducing the print job; and
  receiving user selection of a print shop.

40. The article of manufacture of claim 39, further comprising displaying cost information for each print shop in the list.

41. The article of manufacture of claim 39, further comprising:
  receiving user selection of a delivery method; and taking action to transmit the print file to the selected print shop.

42. The article of manufacture of claim 41, wherein taking action comprises generating and transmitting an electronic message including the print file to the selected print shop.

43. The article of manufacture of claim 31, wherein the set of attributes includes at least one of the following print attributes: drill holes selected, bleeds selected, resolution, paper size, paper type, paper weight, fonts, collate, color printer, duplex, fax, and fold.

44. An article of manufacture for checking an electronic representation of a print job, the article of manufacture comprising computer usable media including at least one computer program and at least one work process embedded therein that causes at least one computer to perform;

comparing information on a set of attributes of a print job indicated in a first computer readable file with transformed output of the print job in a second computer readable file, wherein each attribute in the set of attributes specifies an attribute value, wherein the first computer readable file includes attributes of the print job that require minimum margins and wherein the second computer readable file comprises a bitmap created by rasterizing the print job determining attributes of the transformed output corresponding to the set of attributes;

determining required margins to print according to the attributes in the first computer readable file; and scanning the bitmap file to determine whether any pixels are set "on" within the required margins, wherein the information is inconsistent if one pixel is set "on" in the bitmap file within the required margins; and indicating each determined inconsistency.

45. The article of manufacture of claim 44, wherein the required margins are sufficient to allow one of holes to be drilled in a left margin and bleeds to be printed in a right margin.

* * * * *